US005496636A

United States Patent [19]

Gu et al.

[11] Patent Number: 5,496,636
[45] Date of Patent: Mar. 5, 1996

[54] PRINTABLE SELF-WOUND FIRE RETARDANT PRESSURE-SENSITIVE ADHESIVE TAPE

[75] Inventors: Fan Gu, Tyngsboro; Cheryl A. Prudhomme, Methuen, both of Mass.

[73] Assignee: Ideal Tape Co., an American Biltrite Company, Lowell, Mass.

[21] Appl. No.: 272,494

[22] Filed: Jul. 8, 1994

Related U.S. Application Data

[63] Continuation of Ser. No. 998,808, Dec. 29, 1992, abandoned.

[51] Int. Cl.[6] .................................................... C09J 7/02
[52] U.S. Cl. .......................... 428/352; 428/353; 428/354; 428/355; 428/906; 428/921
[58] Field of Search ...................... 428/354, 353, 428/352, 343, 920, 921, 906; 427/208, 208.4

[56] References Cited

U.S. PATENT DOCUMENTS

| | | | |
|---|---|---|---|
| 3,543,920 | 12/1970 | Crocker et al. | 206/59 |
| 3,967,031 | 6/1976 | Lambert | 428/294 |
| 3,978,274 | 8/1976 | Blum | 428/476 |
| 4,056,661 | 11/1977 | Sato et al. | 428/144 |
| 4,070,523 | 1/1978 | Blum et al. | 428/352 |
| 4,207,374 | 6/1980 | Groff | 428/261 |
| 4,308,313 | 12/1981 | Groff | 428/284 |
| 4,465,717 | 8/1984 | Crofts et al. | 428/40 |
| 4,522,870 | 6/1985 | Esmay | 428/252 |
| 4,587,156 | 5/1986 | Wu | 428/207 |
| 4,587,167 | 5/1986 | Maietti et al. | 428/352 |
| 4,599,260 | 7/1986 | Truskolaski et al. | 428/207 |
| 4,693,920 | 9/1987 | Agarwal et al. | 428/40 |
| 4,992,331 | 2/1991 | DeCoste, Jr. | 428/354 |
| 5,354,588 | 10/1994 | Mitchell et al. | 428/354 X |

Primary Examiner—Jenna L. Davis
Attorney, Agent, or Firm—Pennie & Edmonds

[57] ABSTRACT

A printable, pressure-sensitive adhesive ("PSA") tape, particularly a self-wound tape, which comprises a polyester film substrate, a rubber base prime coat and an adhesive which can be fire-retardant. The PSA tape has high adhesive properties and a novel release mechanism which does not use any conventional release agents.

15 Claims, 1 Drawing Sheet

PRINTABLE SELF-WOUND FIRE RETARDANT PRESSURE-SENSITIVE ADHESIVE TAPE

This is a continuation of application Ser. No. 07/998,808, filed Dec. 29, 1992, now abandoned.

TECHNICAL FIELD

This invention relates generally to a printable pressure-sensitive adhesive tape. In particular, the invention relates to a self-wound, printable, pressure-sensitive adhesive tape which uses a fire-retardant adhesive and a natural rubber based prime coating which acts not as a traditional prime coat but acts as both a printable coating and a release agent.

BACKGROUND OF THE INVENTION

Pressure-sensitive adhesive tapes and specifically printable, fire-retardant, pressure-sensitive adhesive tapes have many applications, for example, for use in aircraft, ships, computers, electrical appliances, and in audio and visual equipment as wrapping for electronic components where a flame retardant thermal insulator is required and the ability to print an identification code is necessary, i.e., for transistors, capacitors, resistors and electrical wires as identification labels and/or as insulation; and for identification or labelling purposes for hydraulic lines, etc.

Pressure-sensitive adhesive tapes can be applied with hand pressure in the absence of solvents or heat and stick aggressively to most common surfaces. Cloth, paper, films, foils, strand reinforced backings as well as many laminates have been employed as tape backing for pressure sensitive adhesive tapes. These are always thin and flexible to conform readily to the surface upon which they are applied. The most commonly used films for pressure-sensitive adhesive tapes are cellophane, polyvinyl chloride, polyester, polyethylene, polypropylene and the cellulose acetate films. The films are generally coated with a very thin anchor coating called a primer to improve the bonding of the adhesive to backing. The films are often coated on the opposite side with a release agent to reduce the adhesion of the adhesive to the backside of the next layer of tape when in roll form. Stearate chromic chloride, octadecyl acrylate-acrylic acid copolymers, and similar polymers, as well as cured dimethyl silicone coatings, are used as release agents.

The prior art provides many examples of pressure-sensitive adhesive tapes both printable and unprintable as well as fire-retardant and non-fire retardant.

For example, U.S. Pat. No. 3,543,920 discloses a pressure-sensitive adhesive tape which is coated with a release composition which incorporates a printable film forming resin and a copolymer of stearyl methacrylate and acrylonitrile as a release agent to provide easy release from the roll on which it is wound and good printability.

U.S. Pat. No. 3,967,031 describes a pressure-sensitive adhesive tape having a backsize or release coating which is a blend of 5–80 parts cellulose acetate butyrate and 95–20 parts copolyester and/or acrylate copolymer and having both printability and low-unwind characteristics.

U.S. Pat. No. 3,978,274 describes a pressure-sensitive tape with a printable release coat on the side opposite to the adhesive face, which release coat comprises a ternary system consisting of vinyl film former, an acrylic resin and a polyamide plasticizing resin.

U.S. Pat. No. 4,056,661 provides a printable self-wound tape by coating a discontinuous layer of silicone resin as a release agent over a coarse, and therefore printable, surface layer of pigment and binder.

Blum et al., in U.S. Pat. No. 4,070,523 use polyketone resins blended with a monomeric or polymeric release agent such as long chain urethanes of polyvinyl alcohols as an ingredient of the release coating for a flexible pressure-sensitive tape.

U.S. Pat. No. 4,587,156 discloses a printable, self-wound, pressure-sensitive adhesive tape in which the backsize coating is comprised of a ternary mixture of an octadecylacrylate release agent, a primer resin of chlorinated polyolefins and an ink anchoring resin made of cellulose acetate butyrate.

U.S. Pat. No. 4,587,167 discloses a release-coating composition for producing a pressure-sensitive, printable adhesive tape consisting of a ketone resin, a polyamide resin and a ketone resin modified by reaction with alkylisocyanates. In addition, the printing ink is specific to this system and is modified with polyamide resins and silicone polymer as a step agent.

U.S. Pat. No. 4,599,260 issued to Truskolaski et al. describes a directly printable tape with a release coating which consists of polyvinyl carbamate polymer, a common release agent. To render this material printable the release coating must be heated on the coated substrate and printed with an ink that has been modified with resinous binder and chlorinated polyolefins.

U.S. Pat. No. 4,992,331 describes a flame retardant conformable adhesive tape which consists of a water-impermeable chlorinated polyethylene backing layer, an evenly tearable synthetic fiber cloth or scrim, a flame-retardant adhesive which is preferably rubber-based and a thin two coat layer between the backing and the scrim.

Similarly, pressure-sensitive flame retardant laminate material has been disclosed in U.S. Pat. No. 4,693,920. This pressure-sensitive composite material is not a self-wound product and incorporates in release liners into its composition.

It is an object of the present invention to provide a novel self-wound, fire-retardant, pressure-sensitive adhesive ("PSA") tape. In addition, it is an object of the present invention to provide such a PSA tape which can be used in electrical applications.

It is an object of the present invention to provide a printable PSA adhesive tape which does not necessitate the use of a separate release agent or release coating.

It is a further object of the present invention to provide a simple three part system for a printable fire-retardant PSA adhesive tape which has good adhesive, release and self-winding properties.

Another object of the present invention is to provide a PSA adhesive tape which comprises a flame retardant adhesive on a polyester film substrate.

It is yet another object of the present invention to provide a rubber base prime coat that has excellent release properties while accepting flexographic printing ink.

SUMMARY OF THE INVENTION

The present invention is a novel printable, fire-retardant pressure-sensitive adhesive ("PSA") tape, preferably a self-wound PSA tape, comprising a layer of polyester film having first and second opposing sides, a flame-retardant pressure-sensitive adhesive disposed on said first side and a printable rubber base prime coat which accepts printing ink being disposed on said second side. The printable, fire-retardant, self-wound PSA tape has low adhesion to backing properties, i.e., the adhesive easily releases or unwinds from the printable rubber based prime coat. Further, the PSA tape of the present invention has this excellent release property without the use of any of the commonly used release agents or coatings such as polysiloxanes, polycarbamates, or chrome complexes, none of which accepts printing ink.

The present invention further relates to a novel release mechanism wherein the adhesive which is coated on one side of a raw polyester film easily releases or unwinds from the printable rubber base prime coat which is coated on the other side of the raw polyester film. This is unexpected. Since a prime coat generally anchors adhesive to the backing, one would expect the prime coat of the applicant's tape to anchor the adhesive to the polyester film. However, this is not the case in the present invention. It has been discovered that the simple three part system of the present invention allows for easy release of the self-wound PSA tape and for acceptance of flexographic printing ink by the rubber base prime coat.

BRIEF DESCRIPTION OF THE FIGURES

These and other objects, features and advantages of the invention will be more readily apparent from the following Detailed Description of the Invention in which the drawing depicts a preferred embodiment of the printable, self-wound fire-retardant adhesive tape of the present invention in an enlarged cross sectional view.

DETAILED DESCRIPTION OF THE INVENTION

Figure 1:
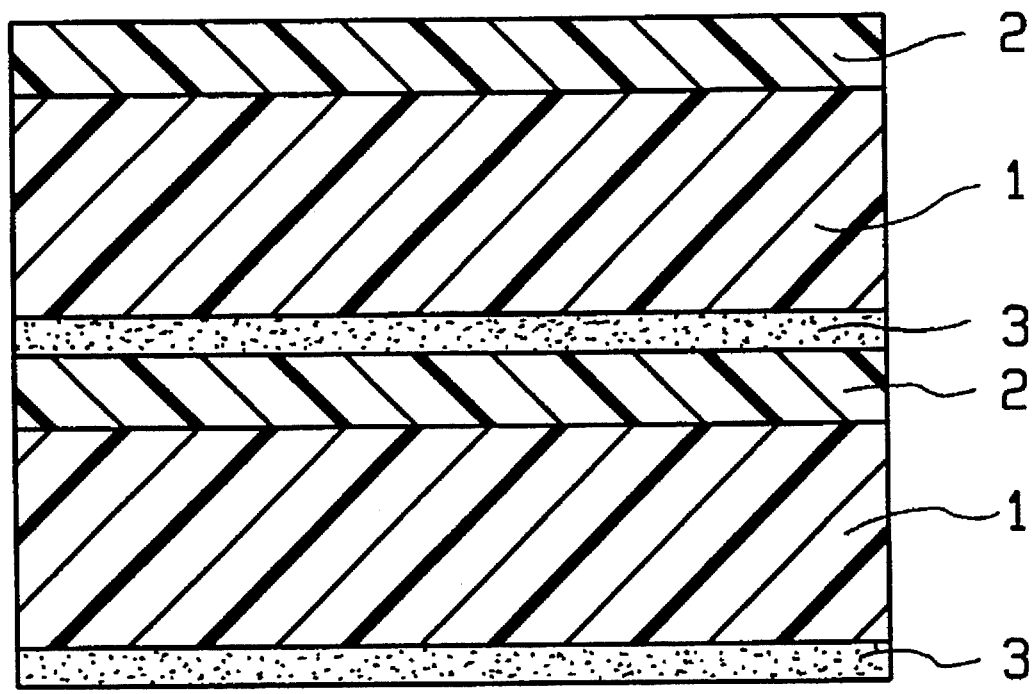

Acrylic and rubber base pressure-sensitive adhesive tapes commonly use a release or backsize coating to produce a self-wound product. The term "self-wound" as used herein means that the pressure-sensitive adhesive tape is wound upon itself thereby forming a roll of tape from which the tape can be unwound.

These release coatings, the majority of which are silicone based, have a low surface energy and will not accept flexographic printing inks, i.e., they are not printable PSA tapes. As used herein, the term "printable" means that the tape will retain an ink image that is transferred from a printing device. Therefore, further components must be added to the PSA tape system to allow it to accept printing ink.

As shown in the drawing, the present invention is a pressure sensitive adhesive tape comprising a polyester film substrate 1 that is coated on one side with a flame-retardant pressure-sensitive adhesive 2 and on the other side with a rubber base prime coat 3 which accepts print and which releases the flame-retardant pressure-sensitive adhesive. Moreover, the present invention is a simple three component system which does not utilize both a release coat or agent and a printable coat in addition to the tape backing and adhesive. Surprisingly, it has been discovered that a rubber base prime coat can function as both a printable coat and a release coat in the PSA tape system of the present invention. The present invention encompasses both self-wound tapes and those which are not.

In the case of the self-wound tape shown in the drawing, the tape is wound upon itself in roll form in successive convolutions with the adhesive layer 2 of one convolution in contact with the printable rubber base prime coat 3 of the contiguous convolution and the inked areas printed thereon.

Many different types of tape backings are available for use with pressure-sensitive adhesive tapes and these are well known to those skilled in the art. It is preferred that polyester be used in the present invention. Suitable polyester films for use in the present invention include, but are not limited to, polyethylene terephthalates such as Mylar® (Dupont), Hostaphan® (Hoescht Celenese) and Mellinex® (ICI). Other polyester films with similar properties to the above and which are known to those skilled in the art may also be utilized.

The printable rubber base prime coat of the present invention which is layered on one side of the polyester film may be comprised of a crosslinked natural rubber [CAS No. 9006-04-6], cis-1,4-polyisoprene [CAS No. 9003-31-0], or synthetic rubber including, but not limited to, isoprenes, styrene-butadiene rubber (SBR's) or acrylonitriles. However, natural rubber is preferred. Suitable crosslinkers used to link the natural or synthetic rubber include, but are not limited to, halogenated phenolic resins such as Schenectady's SP-1056 or an isocyanate such as Dow Papi®.

The flame-retardant adhesive may be an acrylic pressure-sensitive adhesive such as Avery HVX-351 an acrylic copolymer having a viscosity of 6,000–12,000 cps crosslinkable to yield a tacky pressure sensitive adhesive, which is rendered fire-retardant by addition of about 15% antimony oxide and about 40% decabromodiphenyl oxide. Commercially available flame-retardant acrylics are also within the scope of the present invention. These commercially available fire-retardant adhesives include, but are not limited to Avery AS1846, an acrylic copolymer having a viscosity of 2,000–5,000 cps crosslinkable to yield a tacky pressure sensitive adhesive; Gelva 2480, a high solids acrylic resin for high performance applications; and Aroset 1085, a heat activated crosslinking acrylic pressure sensitive adhesive. Avery HVX-351 which can be rendered fire-retardant is a preferred adhesive due to its inexpensive cost and desirable rheological properties. It should be appreciated that non-flame retardant pressure-sensitive adhesives are within the scope of the present invention. However, flame-retardant adhesives are preferred.

The prime coat can be applied to the film substrate by conventional methods such as roto-gravure or mayer rod. The coated film is then passed through a convection oven and heat cured. The film may or may not be corona treated, depending on line speeds.

The acrylic adhesive can be applied by typical coating methods, i.e., reverse roll, mayer rod, knife over roll, etc. The adhesive is also dried by passing the coated film through a convection oven.

As stated above, the PSA tape disclosed in the present invention accepts printing ink. Various printing inks known to those skilled in the art can be used in the present invention including but not limited to letter press and lithographic inks (oil or paste inks) and flexographic and rotograving inks. Common inks for use on pressure-sensitive adhesive tapes are those of the flexographic type. Flexographic inks are usually based on nitrocellulose or polyamide. Nitrocellulose inks can be of various types and are often combined with other materials such as acrylates. They are usually solubilized in low boiling solvents such as alcohols. Flexographic inks are printed from a rotary drum covered by relief plates which are made of a flexible material such as rubber. This process is intended for fast economical operation and for this reason, the flexographic inks must be highly volatile in order to dry rapidly. Flexographic inks are particularly useful in printing on cellulosic substrates such as cellophane, paper, cotton cloth and certain types of plastic film including polyvinylacetate, polyvinyl alcohol, polyesters, polyolefins as well as certain metals such as aluminum foil. Flexographic printing inks are preferred for use in the present invention. These inks are accepted by the rubber base prime coat thereby allowing the PSA tapes of the present invention to be used for identification purposes.

To achieve satisfactory unwind properties, most self-wound pressure-sensitive tapes utilize a release coating on the back side of the substrate. The common release coatings such as polysiloxanes, polycarbamates, chrome complexes (e.g., duPont "Quilon") do not accept printing ink. Therefore, most printable tapes must incorporate either a removable release liner or are comprised of printable paper or cloths that will accept printing inks because of their coarse surface. The present invention provides a novel printable pressure-sensitive adhesive tape which does not use a common release coating.

The present invention has a unique release mechanism in that the adhesive and the rubber based prime coat are in direct contact with opposite sides of the polyester film and therefore when wound come into contact with each other. However, the PSA tape of the present invention is easily unwound without using a release coating due to the unexpected release properties of the printable rubber base prime coat. The release mechanism, i.e., the rubber base prime coat, is unique in that it is coated on a raw polyester film, it is printable and it is chemically comprised of a cured rubber base system.

The invention is further defined by reference to the following examples describing in detail the testing and preparation of the present invention. It will be apparent to those skilled in the art, that many modifications, both to materials and methods, may be practiced without departing from the spirit and scope of this invention.

EXAMPLES

Example 1: Demonstration of the Release Property of the Rubber Based Prime Coat

Lab samples were prepared in one case where Avery 351-HVX flame retardant adhesive was coated on raw polyester film and in a second case where the Avery 351-HVX adhesive was coated on one side of a polyester film which was already coated with a rubber base prime coat, in order to improve anchorage. The samples were blocked overnight to raw polyester film at 158° F. to simulate accelerated aging of release properties. As expected, in the first case the raw to raw polyester film was bonded together or "blocked". The unexpected result was that in the second case the rubber base prime coat actually released the adhesive contrary to anchoring it to the film as would be expected. Also unique was the fact that this prime coat which was now acting as a release coat also accepted print.

Example 2: Properties of Another Fire-Retardant PSA Tape of the Present Invention (PT-456)

|  | PT-456 | Major Competitors |
|---|---|---|
| Adhesion to Steel | 37 | 57 |
| (oz/in) |  |  |
| Adhesion to Backing | 16 | 58 |
| (oz/in) |  |  |
| Dielectric Breakdown | 5500 | 7300 |
| (volts) |  |  |
| Unwind (oz/in) | 18 | 38 |
| Flammability | Meets UL 510 | Meets UL 510 |

PT-456 is prepared from Avery 351-HVX adhesive which is rendered flame-retardant with the addition of about 15% antimony oxide and about 40% decabromodiphenyl oxide disposed on a raw polyester film with a rubber base prime coat of natural rubber crosslinked by isocyanate (PC-010) on the other side of the polyester film.

What is claimed is:

1. A ternary printable, pressure-sensitive adhesive tape not having a release agent or coating consisting essentially of:

a polyester film substrate having first and second opposing sides;

a pressure-sensitive adhesive layer disposed on said first side; and a rubber base prime coat capable of accepting printing ink being disposed on said second side of said substrate, which prime coat comes in direct contact with said adhesive when the tape is wound up on itself in roll form and which releases said adhesive without the use of a separate release coating; said prime coat comprising natural rubber crosslinked by an isocyanate.

2. The printable, pressure-sensitive adhesive tape of claim 1 which is wound upon itself in roll form in successive convolutions with the adhesive layer of one convolution in contact with the rubber base prime coat of a contiguous convolution.

3. The pressure-sensitive adhesive tape of claim 1 wherein said adhesive is an acrylic.

4. The pressure-sensitive adhesive tape of claim 3 wherein said adhesive is fire-retardant.

5. The pressure sensitive adhesive tape of claim 4 wherein said fire-retardant adhesive is selected from the group consisting of an acrylic copolymer having a viscosity of 6,000–12,000 cps crosslinkable to yield a tacky pressure sensitive adhesive having about 15% antimony oxide and about 40% decabromodiphenyloxide, an acrylic copolymer having a viscosity of 2,000–5,000 cps crosslinkable to yield a tacky pressure sensitive adhesive, a high solids acrylic resin for high performance applications and a heat activated crosslinking acrylic pressure sensitive adhesive.

6. The pressure-sensitive adhesive tape of claim 1 wherein said polyester film substrate is a polyethylene terephthalate.

7. The printable, self-wound pressure-sensitive adhesive tape of claim 1 wherein the rubber base prime coat accepts flexographic inks.

8. The printable, self-wound pressure-sensitive adhesive tape of claim 1 wherein said printing ink is flexographic ink.

9. A ternary printable, pressure-sensitive adhesive tape not having a release agent or coating comprising:

a polyester film substrate having first and second opposing sides;

a pressure-sensitive adhesive layer disposed on said first side; and a rubber base prime coat capable of accepting printing ink being disposed on the other side of said substrate which releases said adhesive without the use of a separate release coating, said prime coat comprising natural rubber crosslinked by an isocyanate.

10. The printable, pressure-sensitive adhesive tape of claim 9 which is wound upon itself in roll form in successive convolutions with the adhesive layer of one convolution in contact with the rubber base prime coat of a contiguous convolution.

11. The pressure-sensitive adhesive tape of claim 9 wherein said adhesive is an acrylic.

12. The pressure-sensitive adhesive tape of claim 11 wherein said adhesive is fire-retardant.

13. The pressure sensitive adhesive tape of claim 12 wherein said fire-retardant adhesive is selected from the group consisting of an acrylic copolymer having a viscosity of 6,000–12,000 cps crosslinkable to yield a tacky pressure sensitive adhesive having about 15% antimony oxide and about 40% decabromodiphenyloxide, an acrylic copolymer having a viscosity of 2000–5,000 cps crosslinkable to yield a tacky pressure sensitive adhesive, a high solids acrylic resin for high performance applications and a heat activated crosslinking acrylic pressure sensitive adhesive.

14. The pressure-sensitive adhesive tape of claim 9 wherein said polyester film substrate is a polyethylene terephthalate.

15. The printable, self-wound pressure-sensitive adhesive tape of claim 9 wherein the rubber base prime coat accepts flexographic inks.

* * * * *